US012803090B2

(12) United States Patent
Sheng et al.

(10) Patent No.: US 12,803,090 B2
(45) Date of Patent: Nov. 17, 2026

(54) BATTERY

(71) Applicant: ZHUHAI COSMX BATTERY CO., LTD., Zhuhai (CN)

(72) Inventors: Donghui Sheng, Zhuhai (CN); Jiageng Xiong, Zhuhai (CN); Ning Peng, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 673 days.

(21) Appl. No.: 18/354,854

(22) Filed: Jul. 19, 2023

(65) Prior Publication Data

US 2023/0361397 A1 Nov. 9, 2023

Related U.S. Application Data

(63) Continuation of application No. PCT/CN2022/081081, filed on Mar. 16, 2022.

(30) Foreign Application Priority Data

Mar. 29, 2021 (CN) ......................... 202120636075.4

(51) Int. Cl.
*H01M 50/184* (2021.01)
*H01M 10/052* (2010.01)
(Continued)

(52) U.S. Cl.
CPC ....... *H01M 50/184* (2021.01); *H01M 10/052* (2013.01); *H01M 50/105* (2021.01); *H01M 50/186* (2021.01)

(58) Field of Classification Search
CPC ............. H01M 50/184; H01M 50/105; H01M 10/052; H01M 50/186
See application file for complete search history.

(56) References Cited

U.S. PATENT DOCUMENTS

2013/0216896 A1* 8/2013 Kim .................... H01M 50/124 429/163
2015/0147616 A1* 5/2015 Chemelewski ..... H01M 50/186 429/174
2020/0185787 A1* 6/2020 Ming .................... H01M 10/04

FOREIGN PATENT DOCUMENTS

CN 202134624 U 2/2012
CN 205645897 U 10/2016
(Continued)

OTHER PUBLICATIONS

CN 210092147 MT (Year: 2020).*
(Continued)

*Primary Examiner* — Alexander Usyatinsky
(74) *Attorney, Agent, or Firm* — Westbridge IP LLC

(57) ABSTRACT

A battery includes a battery cell body and a packaging housing. An edge of the packaging housing has an edge banding. The edge banding has a cross section cut along a thickness direction of the edge banding. The edge banding extends upwardly along a side surface of the battery cell body. A side surface, close to battery cell body, of the edge banding is an inner side surface. A side surface, away from battery cell body, of the edge banding is an outer side surface. A first bonding body is disposed on the cross section. The first bonding body wraps the cross section, a part of the inner side surface, and a part of the outer side surface. A thickness L1 of the first bonding body on the inner side surface is greater than a thickness L2 of the first bonding body on the outer side surface.

14 Claims, 6 Drawing Sheets

(51) Int. Cl.
*H01M 50/105* (2021.01)
*H01M 50/186* (2021.01)

(56) References Cited

FOREIGN PATENT DOCUMENTS

| | | | |
|---|---|---|---|
| CN | 108428814 | A | 8/2018 |
| CN | 110690408 | A | 1/2020 |
| CN | 210092147 | U | 2/2020 |
| CN | 112448070 | A | 3/2021 |
| CN | 112567561 | A | 3/2021 |
| CN | 113097608 | A | 7/2021 |
| CN | 214411331 | U | 10/2021 |
| WO | 2018049561 | A1 | 3/2018 |

OTHER PUBLICATIONS

CN 202134624 (Year: 2012).*
International Search Report and Written Opinion issued in corresponding PCT Application No. PCT/CN2022/081081, dated May 30, 2022.

* cited by examiner

BATTERY

CROSS-REFERENCE TO RELATED APPLICATIONS

This application is a continuation of International Application No. PCT/CN2022/081081, filed on Mar. 16, 2022, which claims priority to Chinese Patent Application No. 202120636075.4, filed on Mar. 29, 2021. The disclosures of the aforementioned applications are hereby incorporated by reference in their entireties.

TECHNICAL FIELD

The present application relates to the field of battery technologies, and in particular, to a battery.

BACKGROUND

With the rapid development of modern science and technology, miniaturization of electronic products has become a trend. Batteries are the most commonly used power supply tools with a widest market, and performance of the batteries directly affects operation of the electronic products. Pouch lithium batteries have advantages such as high energy, light weight, low cost, and high safety performance, and have more market advantages.

Generally, a packaging housing for packaging a battery cell body is an aluminum-plastic film, the aluminum-plastic film generally includes an insulating protective layer, an intermediate metal layer, and an insulating heat sealing layer, and the intermediate metal layer is located between the insulating protective layer and the insulating heat sealing layer. Aluminum-plastic film packaging is an important process for a pouch lithium battery. A battery cell body is placed in a packaging housing, and then a hot sealing head is used to tightly press an opening of an aluminum-plastic film for heat sealing, so that insulating heat sealing layers of the aluminum-plastic film are fused together, an edge banding is formed at the opening after heat sealing, and then an excess part of the edge banding is cut. After the excess part of the edge banding is cut, an intermediate metal layer of a cross section of the edge banding is exposed, and the metal layer is easily in contact with an external electronic component, which has a potential risk of short circuit. In addition, when the edge banding left after cutting is subjected to insulation processing, a width of a lithium battery is increased, resulting in loss of energy density of the lithium battery. Thus, the lithium battery requires a larger mounting space, which is not conducive to development of miniaturization of an electronic product.

Therefore, there is a need to develop a battery that can well prevent a metal layer of an edge banding from being exposed to ensure an insulating effect, and reduce a width of the battery.

SUMMARY

The present application provides a battery, to at least solve technical problems that an insulating effect of a cross section of an edge banding is not ideal, and that a large width of the battery results in a large occupied assembly space.

In order to achieve the foregoing objectives, the present application provides a battery, including a battery cell body and a packaging housing. A cavity for accommodating the battery cell body is provided inside the packaging housing, an edge of the packaging housing has an edge banding, and the edge banding has a cross section cut along a thickness direction of the edge banding. The edge banding extends upwardly along a side surface of the battery cell body, a side surface, close to the battery cell body, of the edge banding is an inner side surface, and a side surface, away from the battery cell body, of the edge banding is an outer side surface. A first bonding body is disposed on the cross section, and the first bonding body wraps the cross section, a part of the inner side surface, and a part of the outer side surface. A thickness L1 of the first bonding body on the inner side surface is greater than a thickness L2 of the first bonding body on the outer side surface.

According to the battery provided in the present application, the cross section cut along the thickness direction of the edge banding is wrapped by the first bonding body, and the first bonding body wraps the cross section, a part of the inner side surface, and a part of the outer side surface, thereby ensuring that the first bonding body can steadily wrap the cross section, and ensuring a good insulating effect of the edge banding. In addition, the thickness L2 of the first bonding body on the outer side surface has an impact on the width of the battery. Therefore, according to the battery provided in the present application, the width of the battery is effectively reduced by appropriately reducing the thickness L2 of the first bonding body on the outer side surface, thereby saving the mounting space occupied by the battery.

In a possible implementation, a lower edge of the first bonding body on the outer side surface is higher than a lower edge of the first bonding body on the inner side surface.

In a possible implementation, a distance from a top end of the first bonding body to the lower edge of the first bonding body on the outer side surface is H1, and a numerical range of H1 is H1>0.05 mm.

In a possible implementation, a distance from the top end of the first bonding body to the lower edge of the first bonding body on the inner side surface is H2, and a numerical range of H2 is H2>0.05 mm and H2>H1.

In a possible implementation, a second bonding body is provided between the inner side surface of the edge banding and the battery cell body.

In a possible implementation, a lower edge of the first bonding body on the inner side surface is higher than an upper edge of the second bonding body on the inner side surface.

In a possible implementation, a lower edge of the first bonding body on the outer side surface is higher than an upper edge of the second bonding body on the inner side surface.

In a possible implementation, a lower edge of the first bonding body on the inner side surface is higher than an upper edge of the second bonding body on the inner side surface; and a lower edge of the first bonding body on the outer side surface is higher than an upper edge of the second bonding body on the inner side surface.

In a possible implementation, the top end of the first bonding body is higher than the cross section of the edge banding.

In a possible implementation, a side, close to the battery cell body, of the first bonding body is an inner side of the first bonding body. The thickness L1 of the first bonding body on the inner side surface is a distance, in an orthographic projection direction of the battery cell body, from an inner side end of the first bonding body to the inner side surface of the edge banding, and a numerical range of L1 is 0<L1<0.3 mm.

In a possible implementation, a side, away from the battery cell body, of the first bonding body is an outer side of the first bonding body. The thickness L2 of the first bonding body on the outer side surface is a distance, in an orthographic projection direction of the battery cell body, from an outer side end of the first bonding body to the outer side surface of the edge banding, and a numerical range of L2 is $0<L2<0.3$ mm.

In a possible implementation, a top end of the first bonding body is lower than or equal to a height of a top surface of the battery cell body.

In a possible implementation, a drawing force, along a direction perpendicular to the edge banding, between the first bonding body and the edge banding is greater than or equal to 0.01 kg/mm.

In a possible implementation, a hardness of the first bonding body is greater than 20 A.

In a possible implementation, the battery includes a lithium battery.

The greater the drawing force between the first bonding body and the edge banding in the direction perpendicular to the edge banding, the greater the hardness of the first bonding body, and the stronger the wear resistance of the first bonding body. In this way, it may be avoided that the first bonding body is abraded to expose the metal layer of the cross section due to misoperation of a battery in a PACK process or a machine assembling process, or the like, thereby avoiding a short circuit of the battery and improving safety during use.

According to the battery provided in the present application, a second bonding body is provided between the inner side surface of the edge banding and the battery cell body, and the second bonding body has a thickness occupying a specific width of the battery. The thickness L1 of the first bonding body on the inner side surface and the thickness of the second bonding body occupy a same width space of the battery, and the width of the battery does not increase due to an increase of the thickness L1 of the first bonding body on the inner side surface, but an increase of the thickness L2 of the first bonding body on the outer side surface causes the width of the battery to increase. Therefore, according to the battery provided in the present application, a coating structure of the first bonding body on the inner side surface and the outer side surface of the edge banding is optimized, so that a good insulating effect is ensured, and the width of the battery is effectively reduced by appropriately reducing the thickness L2 of the first bonding body on the outer side surface, thereby increasing energy density of the battery, and then saving the mounting space occupied by the battery.

BRIEF DESCRIPTION OF THE DRAWINGS

To describe the technical solutions in the embodiments of the present application or in the conventional technology more clearly, the following briefly describes the accompanying drawings required for describing the embodiments or the conventional technology. Apparently, the accompanying drawings in the following description show some embodiments of the present application, and a person of ordinary skill in the art may still derive other drawings from these accompanying drawings without creative efforts.

DETAILED DESCRIPTIONS OF THE EMBODIMENTS

To make the objectives, technical solutions, and advantages of the present application clearer, the following clearly and completely describes the technical solutions in the present application with reference to the accompanying drawings in the present application. Apparently, the described embodiments are some but not all of the embodiments of the present application. All other embodiments obtained by a person of ordinary skill in the art based on the embodiments of the present application without creative efforts shall fall within the protection scope of the present application.

Figure 1:
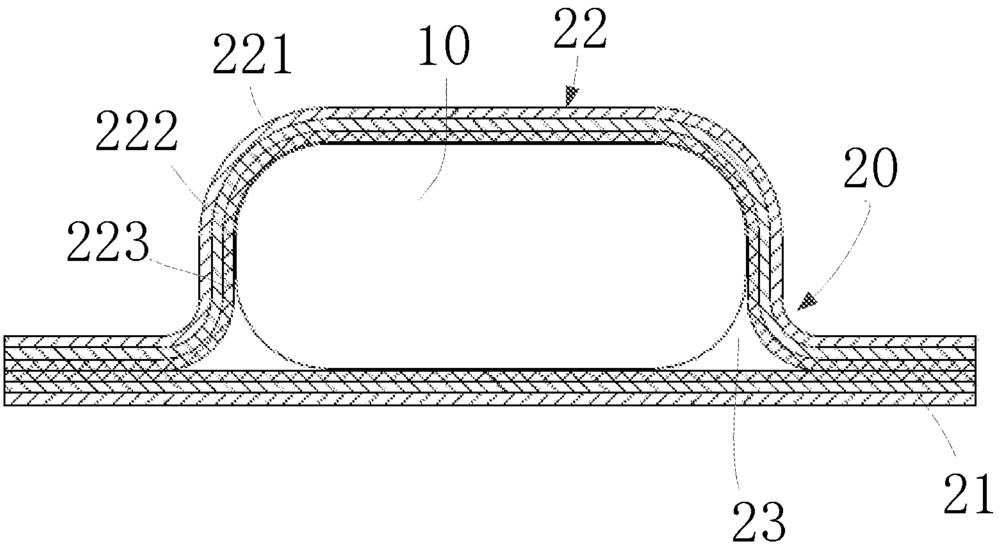
FIG. 1 (Prior art)
FIG. 1 is a schematic structural diagram of a packaging housing of a battery in a state before a first bonding body and a second bonding body are disposed according to prior art.

As shown in FIG. 1, in a battery manufacturing process, a battery cell body 10 is packaged in a packaging housing 20. The packaging housing 20 generally includes two layers of aluminum-plastic films 22, a cavity 23 for accommodating the battery cell body 10 is formed between the two layers of aluminum-plastic films 22, and the aluminum-plastic film 22 is generally a composite film with a multilayer structure. The aluminum-plastic film 22 includes an insulating protective layer 221 at an outer layer, a metal layer 222 at a middle layer, and an insulating heat sealing layer 223 at an inner layer, and the metal layer 222 is located between the insulating protective layer 221 and the insulating heat sealing layer 223. Insulating heat sealing layers 223 of the aluminum-plastic film 22 are fused together by means of a thermoplastic process to form an edge banding 21 for implementing sealing, and then an excess part of the edge banding 21 is cut. The metal layer 222 in the middle of the edge banding 21 is exposed, and the metal layer is easily in contact with an external electronic component, which has a potential risk of short circuit.

In prior art, in order to ensure an insulating effect of the edge banding 21 and improve a space utilization rate of a battery, the edge banding 21 is generally bent twice along a side of the battery cell body 10, to wrap the metal layer 222, and then the edge banding 21 obtained after being bent twice is fastened to the battery cell body 10 by using an insulating adhesive paper; or the edge banding 21 is folded along a side of the battery cell body 10 to adhere to the battery cell body 10 by using a binder or an insulating adhesive paper, and then a metal layer 222 in the edge banding of the battery is insulated by using an insulating adhesive paper. However, such a structure has the following problems: 1. after the edge banding 21 is bent twice, an overlapping part of the edge banding 21 will occupy a width space of the battery, affecting the energy density of the battery; 2. a structure in which the edge banding 21 is bent twice or the edge banding 21 is fixed by means of an insulating adhesive paper cannot be applied to a battery with a special structure, such as an L-shaped battery with an arc edge banding; and 3. when an insulating adhesive paper is used to fix the edge banding 21, different sizes of adhesive papers are required for batteries of different models, resulting in a requirement of a large number of different sizes of adhesive papers, a slow changeover process, incapability of flexible production, and a problem that the adhesive paper is easy to wrinkle.

Figure 2:
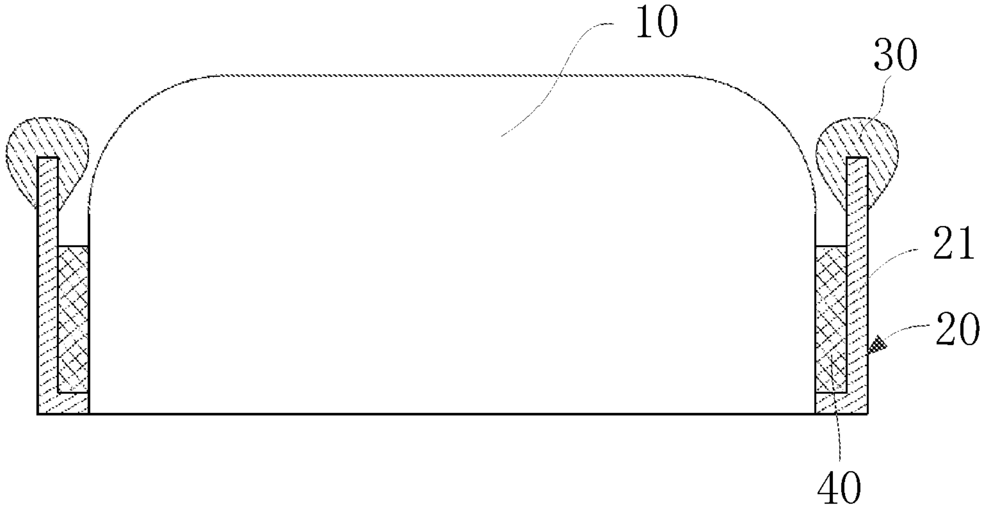
FIG. 2 (Prior art)
FIG. 2 is a schematic structural diagram of a battery before optimization according to prior art.
Figure 3:
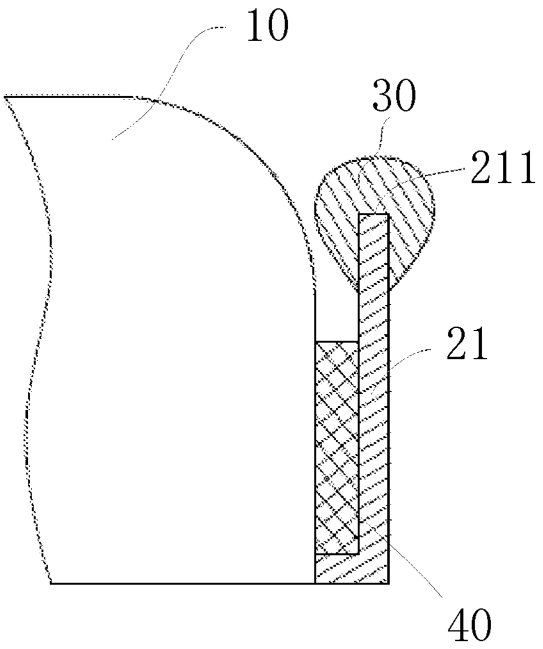
FIG. 3 (Prior art)
FIG. 3 is a partial schematic structural diagram of a battery before optimization according to prior art.
Figure 4:
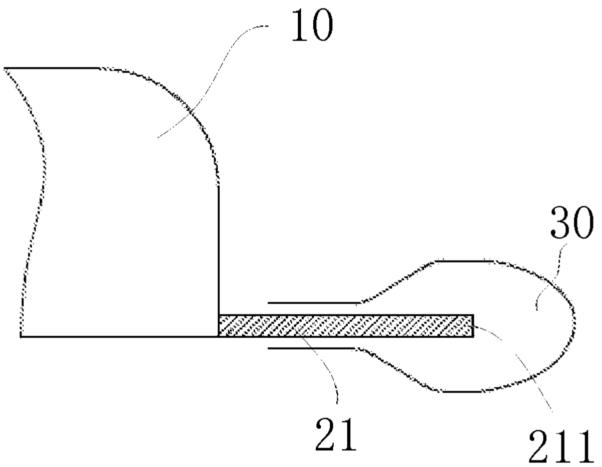
FIG. 4 (Prior art)
FIG. 4 is a schematic structural diagram of a first bonding body of a battery before optimization according to prior art.
Figure 9:
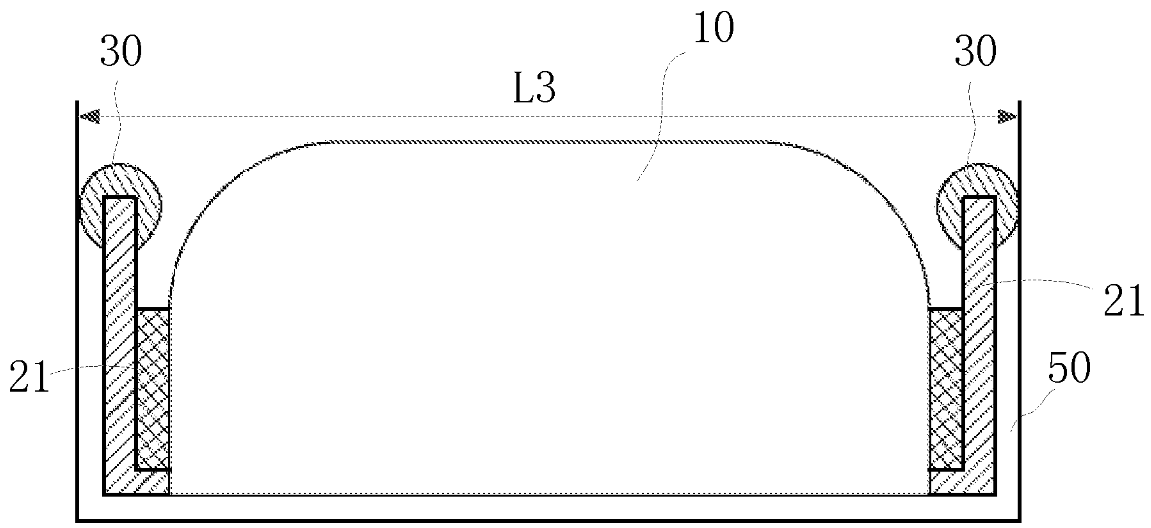
FIG. 9 (Prior art)
FIG. 9 is a schematic installation diagram of a battery before optimization according to prior art.

In addition, as shown in FIG. 2 and FIG. 3, the insulating effect of the metal layer 222 may also be achieved by disposing a first bonding body 30 on the edge banding 21 to wrap the edge banding 21. The first bonding body 30 may be formed after coating and solidifying of an insulating adhesive layer. When the insulating effect is achieved after the first bonding body 30 wraps the edge banding 21, the first bonding body 30 generally has a specific thickness in order to ensure that the first bonding body 30 has a better adhesive strength. As shown in FIG. 4 and FIG. 9, in order to facilitate processing and design of a dispensing head, the dispensing head is generally of a symmetrical design, so that the first bonding bodies 30 disposed on two sides of the edge banding 21 not only have a same thickness, but also have a same width for covering the edge banding 21. In such a structure, a width of a mounting space 50 of the battery in an application device is L3. A portion of the first bonding body 30 disposed on a side, close to the battery cell body 10, of the edge banding 21 substantially does not occupy a width space of the battery, but a portion of the first bonding body 30 disposed on a side, away from the battery cell body 10, of the edge banding 21 generally occupies a portion of width of the battery. Therefore, when assembly is performed during application of the battery, the portion of the first bonding body 30 disposed on the side, away from the battery cell body 10, of the edge banding 21 occupies the mounting space 50 of the battery in the application device.

Figure 5:
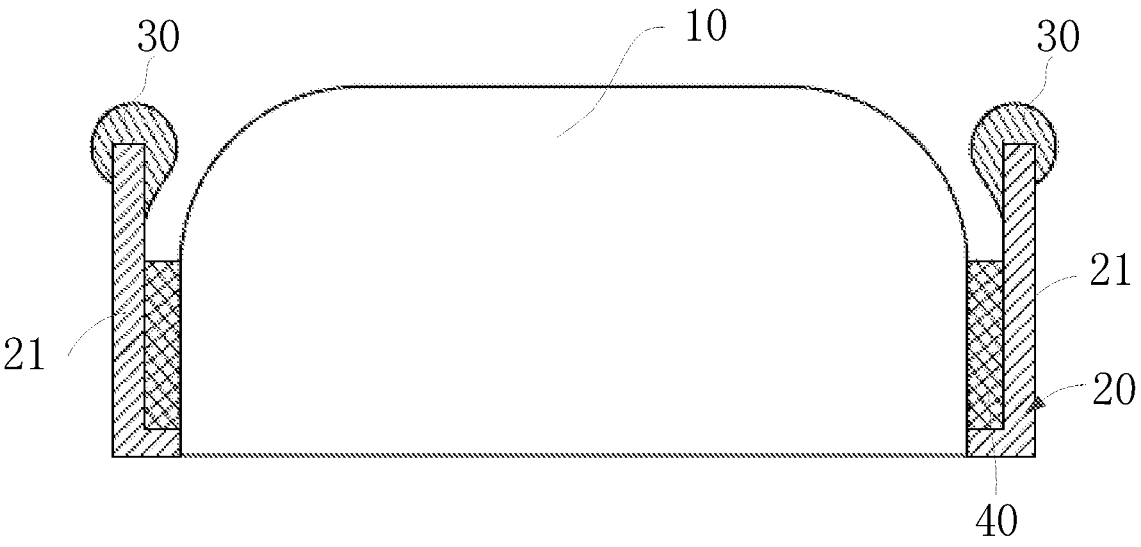
FIG. 5 is a schematic structural diagram of a battery after optimization according to an embodiment of the present application.
Figure 6:
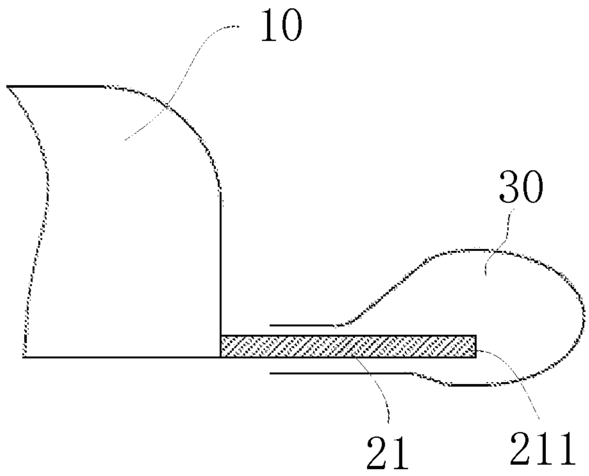
FIG. 6 is a partial schematic structural diagram of the battery in FIG. 5 according to an embodiment of the present application.

In view of the foregoing background, the present application provides a battery, for example, a lithium battery. As shown in FIG. 6, an insulating effect is achieved by disposing a first bonding body 30 on a cross section 211 cut in a thickness direction of an edge banding 21, to wrap the cross section 211. In addition, as shown in FIG. 5, an amount of the first bonding body 30 disposed on a side, away from the battery cell body 10 is reduced by optimizing a structure of the first bonding body 30 disposed on an inner side surface 212 and an outer side surface 213 of the edge banding 21, so that the battery width is reduced. The optimized battery has a smaller width, and further has a smaller volume while ensuring a good insulating effect of the edge banding 21, thereby improving the energy density of the battery. In this way, a smaller mounting space 50 is occupied during assembly.

Figure 8:
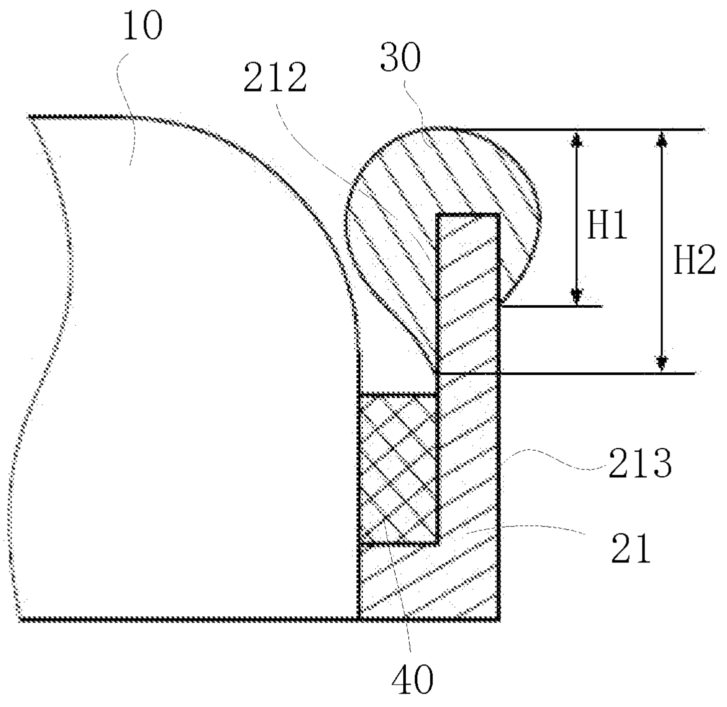
FIG. 8 is another partial schematic structural diagram of a battery according to an embodiment of the present application.

As shown in FIG. 1, the present application provides a battery, including a battery cell body 10 and a packaging housing 20. A cavity 23 for accommodating the battery cell body 10 is provided inside the packaging housing 20, an edge of the packaging housing 20 has an edge banding 21, and the edge banding 21 has a cross section 211 cut along a thickness direction of the edge banding 21. The edge banding 21 extends upwardly along a side surface of the battery cell body 10. As shown in FIG. 8, a side surface, close to the battery cell body 10, of the edge banding 21 is an inner side surface 212, and a side surface, away from the battery cell body 10, of the edge banding 21 is an outer side surface 213. A first bonding body 30 is disposed on the cross section 211, and the first bonding body 30 wraps the cross section 211, a part of the inner side surface 212, and a part of the outer side surface 213, so that the first bonding body 30 stably wraps the cross section 211, ensuring a good insulating effect of the cross section 211.

As shown in FIG. 1, the packaging housing 20 includes two layers of aluminum-plastic films 22, and a cavity 23 for accommodating the battery cell body 10 is formed between the two layers of aluminum-plastic films 22. Each aluminum-plastic film 22 includes an insulating protective layer 221, a metal layer 222, and an insulating heat sealing layer 223, and the metal layer 222 is located between the insulating protective layer 221 and the insulating heat sealing layer 223.

It is easily understood that the cross section 211 cut along a thickness direction of the edge banding 21 has a metal layer 222 exposed outside, and due to good electrical conductivity, the metal layer 222 may cause a short circuit of an external electronic component when being contacted with the external electronic component, thereby affecting the service life of the battery. In the present application, the first bonding body 30 is disposed on the cross section 211, and the first bonding body 30 wraps the cross section 211, a part of the inner side surface 212, and a part of the outer side surface 213, to avoid a short circuit caused by contact between the metal layer 222 exposed from the cross section 211 obtained after cutting and an external electronic component, thereby improving insulation performance and safety during use.

In the present application, the first bonding body 30 is disposed on the cross section 211 of the edge banding 21 to improve the insulation performance, which can be applied to batteries of different shapes and models.

A second bonding body 40 is provided between the inner side surface 212 of the edge banding 21 and the battery cell body 10, and the second bonding body 40 makes a folded edge banding 21 be fixedly bonded to a side surface of the battery cell body 10, thereby improving bonding stability of the edge banding 21.

In the present application, the second bonding body 40 and the first bonding body 30 are used. For production of batteries of different modes, flexible production can be achieved, and during product changeover, it is not necessary to make too many adjustments on a binder coating device for forming the second bonding body 40 and the first bonding body 30, so that the product changeover is simple, thereby improving efficiency and convenience of the product changeover. In addition, the second bonding body 40 is disposed between the inner side surface 212 of the edge banding 21 and a side surface of the battery cell body 10, and the first bonding body 30 is disposed on the cross section 211 of the edge banding 21, so that a problem of wrinkling of an adhesive paper does not occur compared with a method in the conventional technology that the insulating adhesive paper is applied to the edge banding 21.

Figure 7:
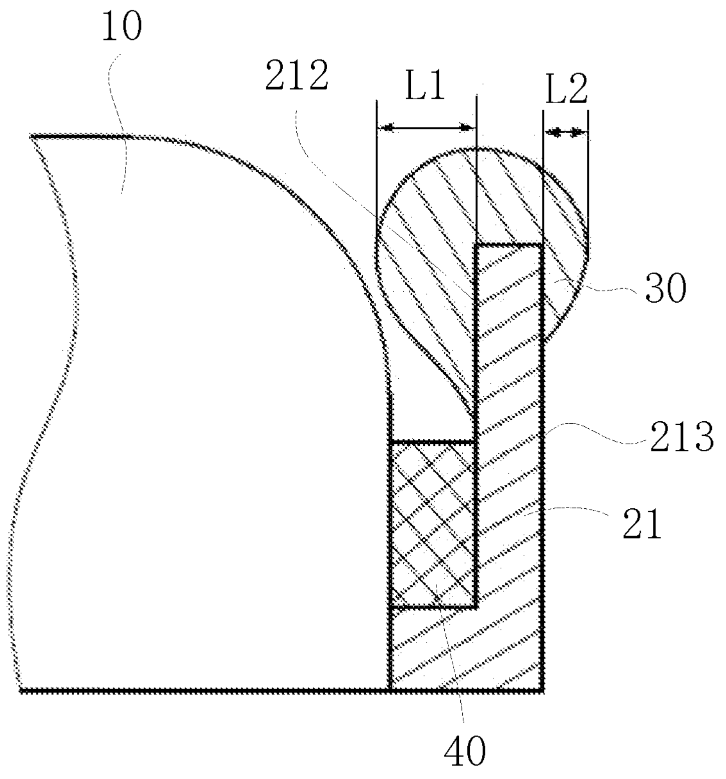
FIG. 7 is a partial schematic structural diagram of a battery according to an embodiment of the present application.

As shown in FIG. 5 and FIG. 7, a thickness L1 of the first bonding body 30 on the inner side surface 212 is greater than a thickness L2 of the first bonding body 30 on the outer side surface 213. In a case that a coating amount of the first bonding body 30 is not changed, a thickness L1 of a portion of the first bonding body 30 disposed on a side, close to the battery cell body 10, of the edge banding 21 is set to be greater than a thickness L2 of a portion of the first bonding body 30 disposed on a side, away from the battery cell body 10, of the edge banding 21, and in some embodiments, as shown in FIG. 8, a width H2 of the portion of the first bonding body 30 disposed on a side, close to the battery cell body 10, of the edge banding 21 is also set to be greater than a width H1 of the portion of the first bonding body 30 disposed on a side, away from the battery cell body 10, of the edge banding 21.

Figure 10:
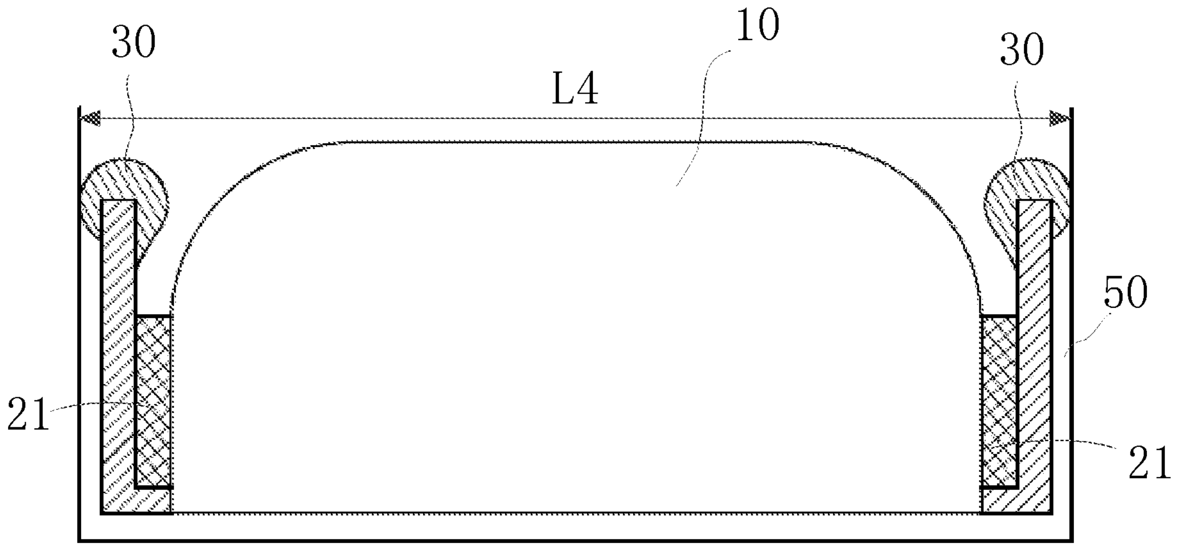
FIG. 10 is a schematic installation diagram of a battery after optimization according to an embodiment of the present application.

As shown in FIG. 7 and FIG. 10, considering that the second bonding body 40 has a specific thickness, and the thickness L1 of the first bonding body 30 on the inner side surface 212 and the thickness of the second bonding body 40 occupy a same width space of the battery, the thickness L1 of the first bonding body 30 on the inner side surface 212 does not affect a width of the battery. However, the thickness L2 of the first bonding body 30 on the outer side surface 213 has a direct impact on the width of the battery. The larger the thickness L2 of the first bonding body 30 on the outer side surface 213, the larger the width of the battery. Thus, battery energy density is reduced, and the mounting space 50 occupied by the battery is large, thereby hindering miniaturization development of a product that uses the battery.

According to the battery provided in the present application, the structure of the first bonding body 30 disposed on the edge banding 21 is optimized. In a case that a coating amount of the first bonding body 30 is not changed, the thickness L1 of the first bonding body 30 on the inner side surface 212 is set to be greater than the thickness L2 of the first bonding body 30 on the outer side surface 213. Overall width of the battery is reduced by reducing the thickness L2, having a great impact on the width of battery, of the first bonding body 30 on the outer side surface 213, thereby achieving an effect of increasing the battery energy density and saving the mounting space 50 occupied by the battery.

The edge banding 21 may be vertically and upwardly folded and extending along a side surface of the battery cell body 10, and may alternatively be upwardly folded and extend in a shape of an arc or an oblique line or the like and along a side surface of the battery cell body 10. The present application is not limited thereto.

As shown in FIG. 7 and FIG. 8, a lower edge of the first bonding body 30 on the outer side surface 213 is higher than a lower edge of the first bonding body 30 on the inner side surface 212, which ensures that a small amount of first bonding body 30 coated on the outer side surface 213 can collectively wrap around a position, close to the cross section 211, of the outer side surface 213, and ensures a good insulating effect of the cross section 211.

In order to ensure adhesive strength of the first bonding body 30 disposed on the cross section 211 of the edge banding 21, and to ensure a stable insulating effect of the cross section 211 of the edge banding 21, a distance from a top end of the first bonding body 30 to the lower edge of the first bonding body 30 on the outer side surface 213 is set to H1, and a numerical range of H1 is H1>0.05 mm.

In order to ensure the adhesive strength of the first bonding body 30 disposed on the cross section 211 of the edge banding 21, and to ensure a stable insulating effect of the cross section 211 of the edge banding 21, a distance from a top end of the first bonding body 30 to the lower edge of the first bonding body 30 on the inner side surface 212 is set to H2, and a numerical range of H2 is H2>0.05 mm and H2 is greater than H1.

A lower edge of the first bonding body 30 on the inner side surface 212 is higher than an upper edge of the second bonding body 40 on the inner side surface 212; and/or a lower edge of the first bonding body 30 on the outer side surface 213 is higher than an upper edge of the second bonding body 40 on the inner side surface 212. Such a structure enables the lower edge of the first bonding body 30 on the inner side surface 212 not to overlap with the upper edge of the second bonding body 40 on the inner side surface 212, avoiding an increase in the width of the battery.

The top end of the first bonding body 30 is higher than the cross section 211 of the edge banding 21, so that a stable insulating effect of the cross section 211 of the edge banding 21 is ensured.

As shown in FIG. 7 and FIG. 8, a side, close to the battery cell body 10, of the first bonding body 30 is an inner side of the first bonding body 30. The thickness L1 of the first bonding body 30 on the inner side surface 212 is a distance, in an orthographic projection direction of the battery cell body 10, from an inner side end of the first bonding body 30 to the inner side surface 212 of the edge banding 21, and a numerical range of L1 is 0<L1<0.3 mm. This ensures that the cross section 211 of the edge banding 21 is insulated, and a size of the first bonding body 30 does not affect the width of the battery, thereby helping to increase energy density of the battery. The view direction shown in FIG. 2 is the orthographic projection direction of the battery cell body 10.

A side, away from the battery cell body 10, of the first bonding body 30 is an outer side of the first bonding body 30. The thickness L2 of the first bonding body 30 on the outer side surface 213 is a distance, in the orthographic projection direction of the battery cell body 10, from an outer side end of the first bonding body 30 to the outer side surface 213 of the edge banding 21, and a numerical range of L2 is 0<L2<0.3 mm. This ensures that the cross section 211 of the edge banding 21 is insulated, and a size of the first bonding body 30 does not affect the width of the battery, avoiding an excessive volume of the battery.

As shown in FIG. 7 and FIG. 8, the top end of the first bonding body 30 is lower than or equal to a height of a top surface of the battery cell body 10, so that overall height of the battery is prevented from being increased due to a coating structure of the first bonding body 30, and the height of the battery is optimized.

The first bonding body 30 is formed by curing a binder in conditions including, but not limited to, heating, moisture, air drying, light, or the like. In a possible implementation, the binder for forming the first bonding body 30 is a flowing binder, for example, an insulating glue, a solid glue, a quick-drying glue, or the like. The binder for forming the first bonding body 30 completely covers and wraps the cross section 211 of the edge banding 21, and then the first bonding body 30 is cured and shaped by heating, moisture, air drying, light, or the like, so that sealing strength of the cross section 211 of the edge banding 21 is higher.

In order to ensure sufficient wear resistance of the first bonding body 30, a drawing force along a direction perpendicular to the edge banding 21 between the first bonding body 30 and the edge banding 21 is greater than or equal to 0.01 kg/mm. The larger the drawing force, the stronger the wear resistance of the first bonding body 30.

A hardness of the first bonding body 30 is greater than 20 A (Shore hardness). The higher the hardness value, the stronger the wear resistance of the first bonding body 30.

The drawing force along the direction perpendicular to the edge banding 21 between the first bonding body 30 and the edge banding 21 and the hardness of the first bonding body 30 collectively define the wear resistance of the first bonding body 30. The larger the drawing force along the direction perpendicular to the edge banding 21 between the first bonding body 30 and the edge banding 21, the larger the hardness of the first bonding body 30, and the stronger the wear resistance of the first bonding body 30. In this way, it may be avoided that the first bonding body 30 is abraded to expose the metal layer 222 of the cross section 21 due to misoperation of the battery in a PACK process or a machine assembling process, or the like, thereby avoiding a short circuit of the battery and improving safety during use.

After the binder for forming the first bonding body 30 is cured, the second bonding body 40 is disposed.

The second bonding body 40 is formed by curing a binder by using a method such as heating, moisture, air drying, or light. The binder for forming the second bonding body 40 is a flowing double-sided adhesive binder, for example, an insulating glue, a solid glue, a quick-drying glue, or the like.

After a surface, opposite to the outer side of the battery cell body 10, of the edge banding 21 is coated with the binder for forming the second bonding body 40, the edge banding 21 is folded and extends vertically upward along a height direction of the battery cell body 10 or folded and extends upward in a circular arc shape and along a side surface of the battery cell body 10, and then the binder for forming the second bonding body 40 is cured and shaped by using a method such as heating, pressurization, moisture, air drying, light, or the like, so that the edge banding 21 and the battery cell body 10 are bonded together.

Figure 11:
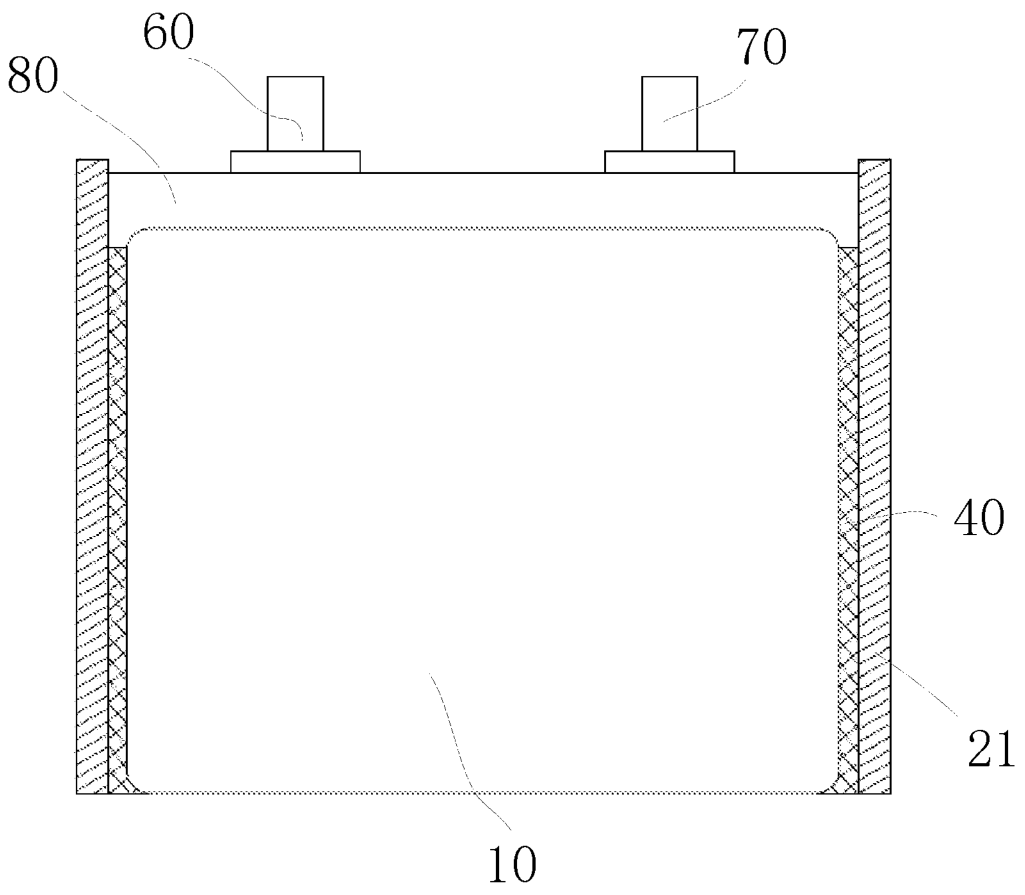
FIG. 11 is a schematic structural diagram of a battery according to an embodiment of the present application.

A shown in FIG. 11, a battery cell body 10 includes a battery cell and a first electrode and a second electrode that are welded to the battery cell. The battery cell includes a positive electrode plate and a negative electrode plate. A coating is applied to front and back sides of a substrate of the positive electrode plate, and a coating is applied to front and back sides of a substrate of the negative electrode plate, and the battery cell is formed by winding the positive electrode plate and the negative electrode plate. One of the first electrode and the second electrode is a positive electrode, and the other is a negative electrode. A positive tab 60 is welded on the positive electrode, a negative tab 70 is welded on the negative electrode, and the positive tab 60 and the negative tab 70 extend from a top seal 80 of an aluminum-plastic film 22.

As shown in FIG. 1, the battery further includes an electrolyte filled in the cavity 23, and the battery cell body 10 is immersed in the electrolyte.

As shown in FIG. 7 and FIG. 10, according to the battery provided in the present application, the second bonding body 40 is disposed between the inner side surface 212 of the edge banding 21 and the battery cell body 10, and the thickness of the second bonding body 40 occupies a specific width of the battery. The thickness L1 of the first bonding body 30 on the inner side surface 212 and the thickness of the second bonding body 40 occupy a same width space of the battery, and the width of the battery does not increase due to an increase of the thickness L1 of the first bonding body 30 on the inner side surface 212, but an increase of the thickness L2 of the first bonding body 30 on the outer side surface 213 causes the width of the battery to increase. Therefore, according to the battery provided in the present application, a coating structure of the first bonding body 30 on the inner side surface 212 and the outer side surface 213 of the edge banding 21 is optimized, so that a good insulating effect is ensured, and the width of the battery is effectively reduced by appropriately reducing the thickness L2 of the first bonding body 30 on the outer side surface 213, thereby increasing energy density of the battery, and then saving the mounting space 50 occupied by the battery.

As shown in FIG. 9 and FIG. 10, a width L4 of the mounting space 50 for the optimized battery in an application device is significantly less than a width L3 of the mounting space 50 for the battery before optimization in an application device.

The numerical values and numerical ranges in the present application are approximate values, and may have errors in a specific range due to an impact of a manufacturing process, but a person skilled in the art may consider these errors to be negligible.

In the descriptions of the present application, it should be understood that the orientations or positional relationships indicated by the terms "center", "length", "width", "thickness", "top", "bottom", "upper", "lower", "left", "right", "front", "back", "vertical", "horizontal", "inner", "outer", "axial", "circumferential", and the like are based on the orientations or positional relationships shown in the accompanying drawings. Such terms are merely intended to facilitate the descriptions of the present application and simplify the descriptions, without indicating or implying that the positions or components mentioned in the present application must have specific orientations, or be constructed and operated in a specific orientation, and therefore shall not be construed as a limitation to the present application.

In addition, the terms "first", "second", and the like are merely intended for a purpose of description, and shall not be understood as an indication or implication of relative importance or implicit indication of the number of indicated technical features. Therefore, the features defined by "first", "second", and the like may indicate or imply that one or more of the features are included. In the description of the present application, "a plurality of" means at least two, for example, two or three, unless otherwise explicitly and specifically defined.

In the present application, unless specified and defined explicitly otherwise, the terms "mounted", "join", "connect", "fixed", and the like should be understood in a broad sense. For example, "connection" may be a fixed connection, a detachable connection, or an integral connection; or may be a mechanical connection, an electrical connection, or a mutual communication; or may be a direct connection or an indirect connection by means of an intermediate medium; or may be an internal communication or an interactive relationship between two elements. Persons of ordinary skill in the art may understand specific meanings of these terms in the present application based on specific situations.

In the present application, unless specified and defined explicitly otherwise, the expression that the first feature is "on" or "below" the second feature may include that the first feature is in direct contact with the second feature, or may include that the first feature and the second feature are not in direct contact with each other, but are contacted via another feature formed therebetween. Moreover, that the first feature is "above", "over", and "on" the second feature includes that the first feature is directly above or obliquely above the second feature, or merely indicates that the first feature is higher than the second feature in horizontal height. That the first feature is "below", "under" and "beneath" the second feature includes that the first feature is directly below or obliquely below the second feature, or simply indicates that the first feature is lower than the second feature in horizontal height.

In conclusion, it should be noted that the foregoing embodiments are merely intended for describing the technical solutions of the present application but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of the present application.

What is claimed is:

1. A battery, comprising a battery cell body and a packaging housing, wherein a cavity for accommodating the battery cell body is provided inside the packaging housing, an edge of the packaging housing has an edge banding, and the edge banding has a cross section cut along a thickness direction of the edge banding;

the edge banding is folded and extends upwardly in a circular arc shape along a side surface of the battery cell body, a side surface, close to the battery cell body, of the edge banding is an inner side surface, a side surface, away from the battery cell body, of the edge banding is an outer side surface, a first bonding body is disposed on the cross section, and the first bonding body wraps the cross section, a part of the inner side surface, and a part of the outer side surface;

a thickness L1 of the first bonding body on the inner side surface is greater than a thickness L2 of the first bonding body on the outer side surface;

the first bonding body forms a covering region on the outer side surface, and the covering region extends downward from the cross section;

a lower edge of the first bonding body on the outer side surface is higher than a lower edge of the first bonding body on the inner side surface, a distance from a top end of the first bonding body to the lower edge of the first bonding body on the outer side surface is H1, a distance from the top end of the first bonding body to the lower edge of the first bonding body on the inner side surface is H2, and H2>H1; and a second bonding body is provided between the inner side surface of the edge banding and the battery cell body, and the first bonding body is spaced apart from the battery cell body and the second bonding body.

2. The battery according to claim 1, wherein a numerical range of H1 is H1>0.05 mm.

3. The battery according to claim 1, wherein a numerical range of H2 is H2>0.05 mm.

4. The battery according to claim 1, wherein a lower edge of the first bonding body on the inner side surface is higher than an upper edge of the second bonding body on the inner side surface.

5. The battery according to claim 1, wherein a lower edge of the first bonding body on the outer side surface is higher than an upper edge of the second bonding body on the inner side surface.

6. The battery according to claim 1, wherein a lower edge of the first bonding body on the inner side surface is higher than an upper edge of the second bonding body on the inner side surface; and a lower edge of the first bonding body on the outer side surface is higher than an upper edge of the second bonding body on the inner side surface.

7. The battery according to claim 1, wherein a top end of the first bonding body is higher than the cross section of the edge banding.

8. The battery according to claim 1, wherein a side, close to the battery cell body, of the first bonding body is an inner side of the first bonding body, the thickness L1 of the first bonding body on the inner side surface is a distance, in an orthographic projection direction of the battery cell body, from an inner side end of the first bonding body to the inner side surface of the edge banding, and a numerical range of L1 is 0<L1<0.3 mm.

9. The battery according to claim 1, wherein a side, away from the battery cell body, of the first bonding body is an outer side of the first bonding body, the thickness L2 of the first bonding body on the outer side surface is a distance, in an orthographic projection direction of the battery cell body, from an outer side end of the first bonding body to the outer side surface of the edge banding, and a numerical range of L2 is 0<L2<0.3 mm.

10. The battery according to claim 1, wherein a top end of the first bonding body is lower than or equal to a height of a top surface of the battery cell body.

11. The battery according to claim 1, wherein a drawing force, along a direction perpendicular to the edge banding, between the first bonding body and the edge banding is greater than or equal to 0.01 kg/mm.

12. The battery according to claim 1, wherein a hardness of the first bonding body is greater than 20 A.

13. The battery according to claim 1, wherein the battery comprises a lithium battery.

14. A method for manufacturing a battery, comprising:

providing a battery cell body and a packaging housing, wherein the packaging housing has a cavity for accommodating the battery cell body is provided inside the packaging housing, an edge of the packaging housing has an edge banding, the edge banding has a cross section cut along a thickness direction of the edge banding, the edge banding is folded and extends upwardly in a circular arc shape along a side surface of the battery cell body, a side surface, close to the battery cell body, of the edge banding is an inner side surface, and a side surface, away from the battery cell body, of the edge banding is an outer side surface;

applying a binder on the cross section, a part of the inner side surface, and a part of the outer side surface to form a first bonding body, wherein the first bonding body is disposed on the cross section, and the first bonding body wraps the cross section, the part of the inner side surface, and the part of the outer side surface; and after the binder forming the first bonding body is cured, applying a binder between the inner side surface of the edge banding and the battery cell body to form a second bonding body, wherein the second bonding body is provided between the inner side surface of the edge banding and the battery cell body, and the first bonding body is spaced apart from the battery cell body and the second bonding body, wherein a thickness L1 of the first bonding body on the inner side surface is greater than a thickness L2 of the first bonding body on the outer side surface, The first bonding body forms a covering region on the outer side surface, and the covering region extends downward from the cross section; and a lower edge of the first bonding body on the outer side surface is higher than a lower edge of the first bonding body on the inner side surface, a distance from a top end of the first bonding body to the lower edge of the first bonding body on the outer side surface is H1, a distance from the top end of the first bonding body to the lower edge of the first bonding body on the inner side surface is H2, and H2>H1.

* * * * *